April 15, 1952  E. A. ROCKWELL  2,593,394
POWER PRESSURE INTENSIFIER
Filed Jan. 24, 1945  4 Sheets-Sheet 1

INVENTOR
Edward A. Rockwell
BY
Arthur Wright
ATTORNEY

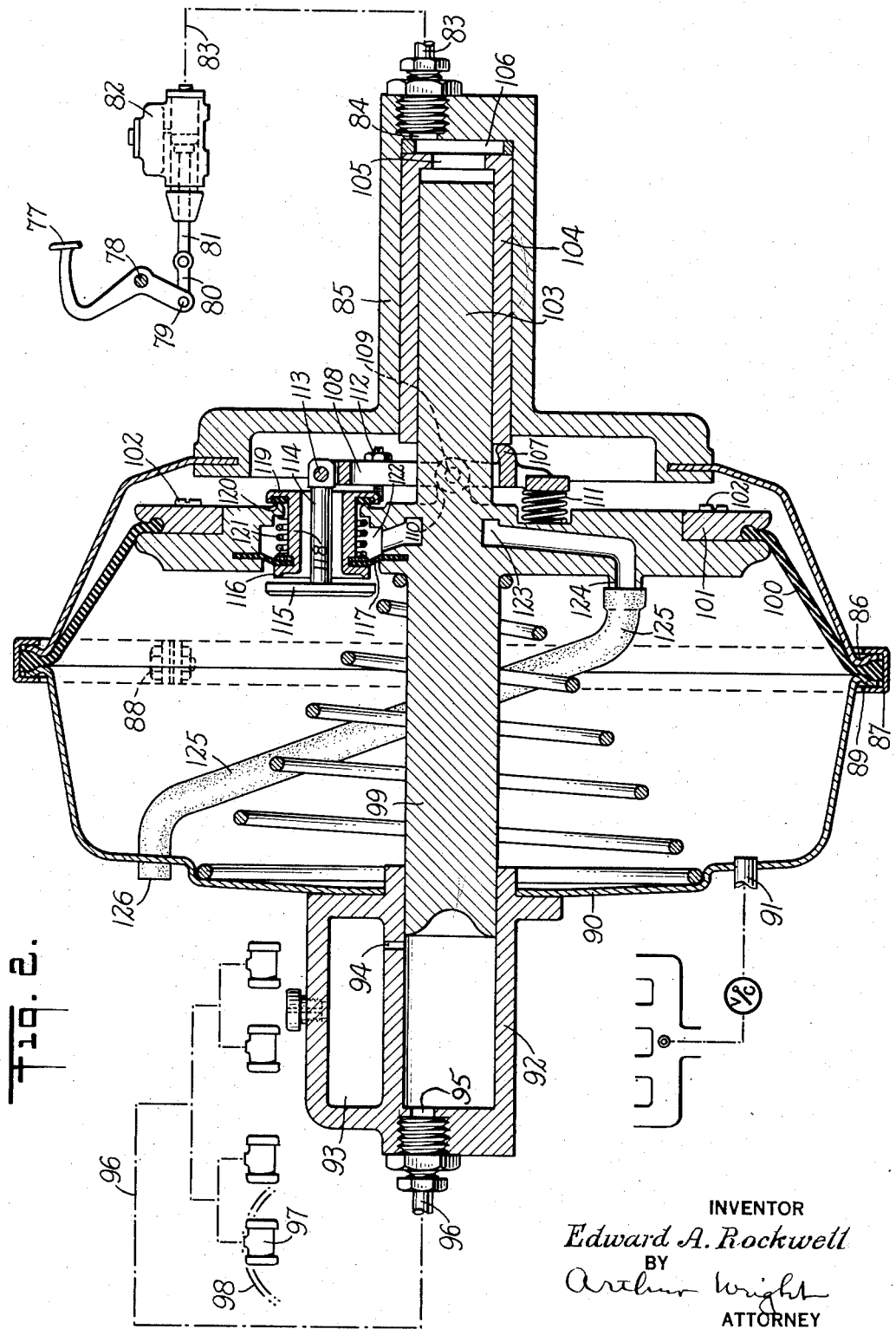

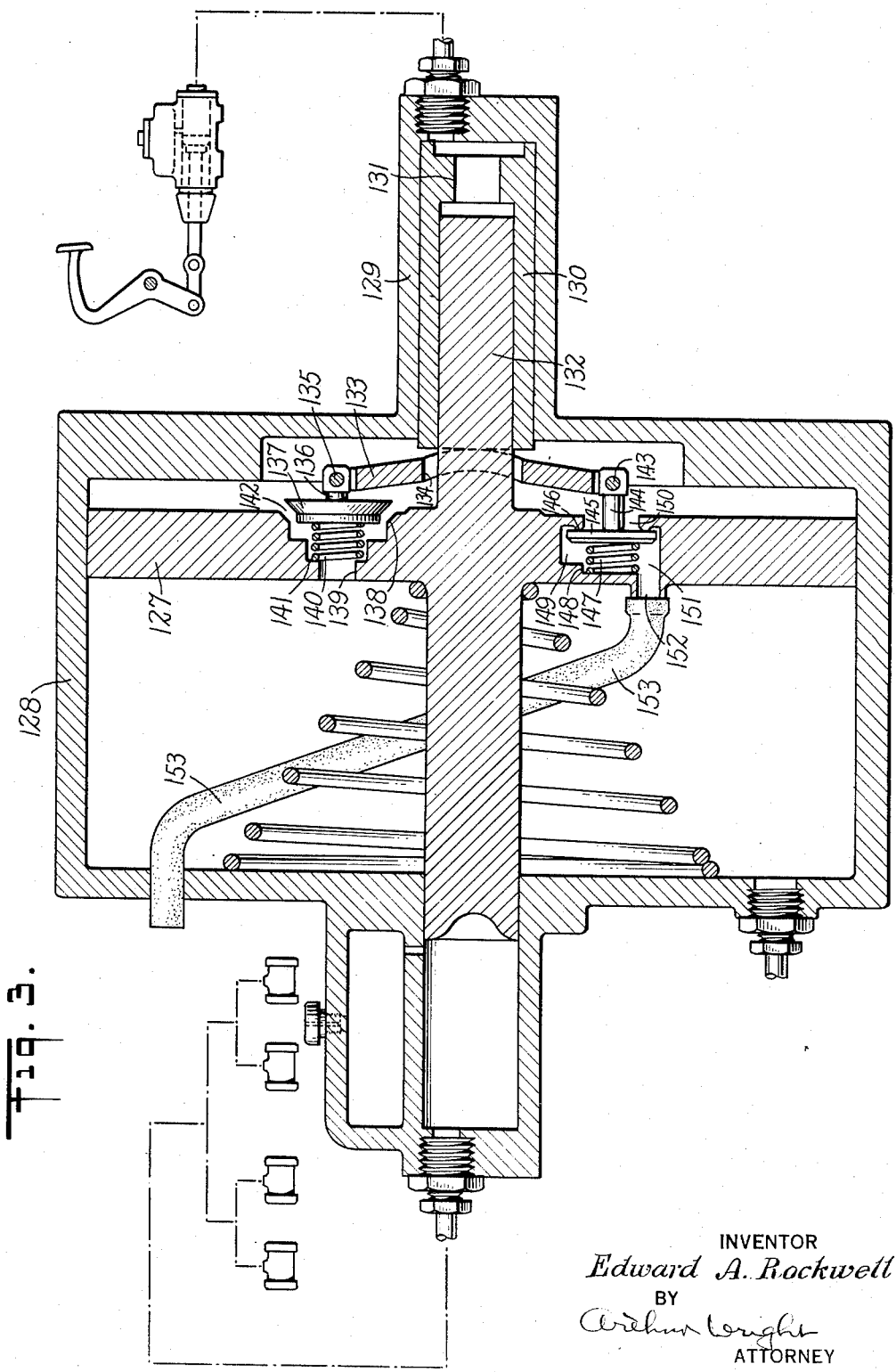

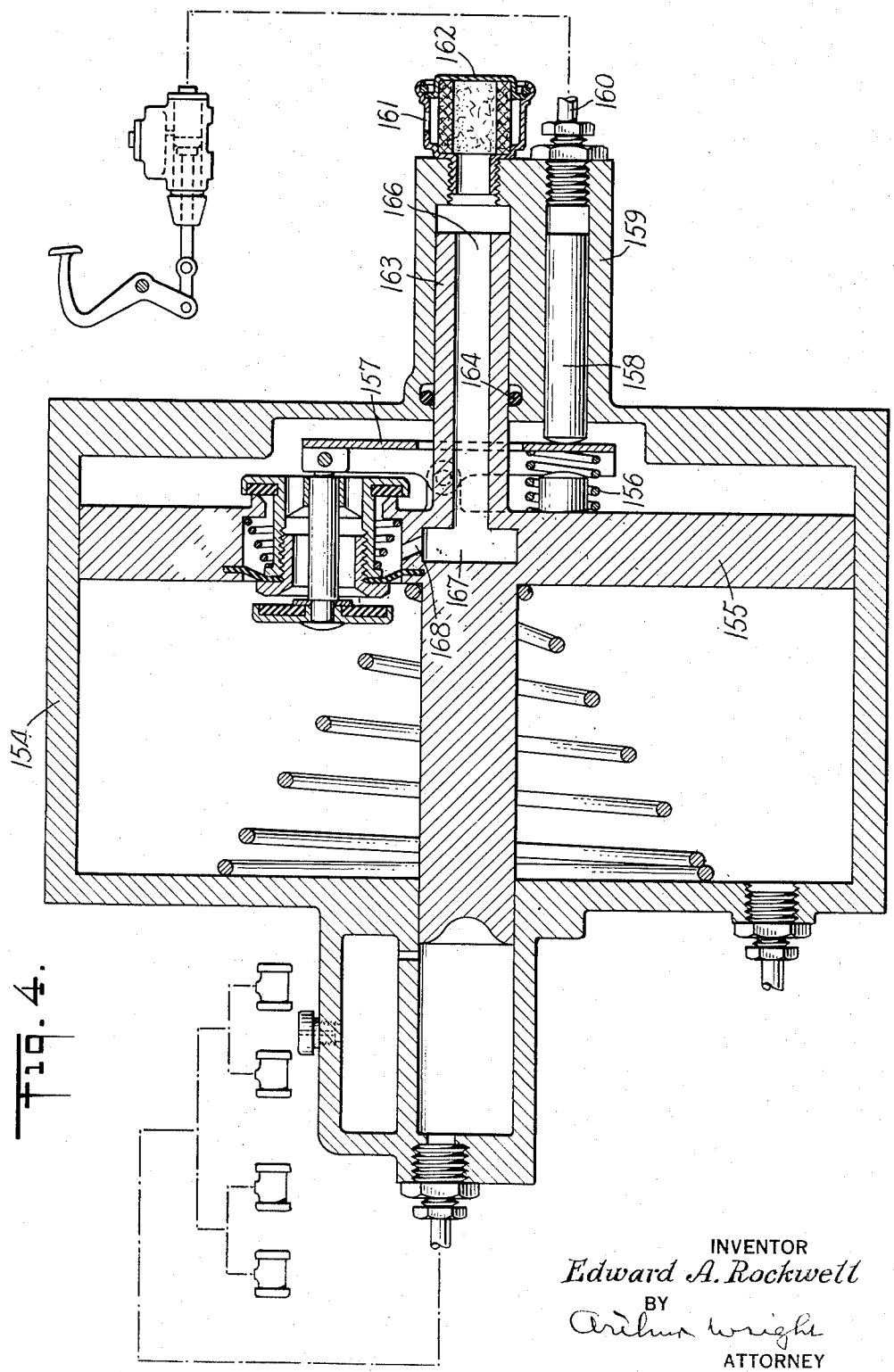

Patented Apr. 15, 1952

2,593,394

UNITED STATES PATENT OFFICE 2,593,394

POWER PRESSURE INTENSIFIER

Edward A. Rockwell, Cleveland, Ohio

Application January 24, 1945, Serial No. 574,325

16 Claims. (Cl. 60—54.5)

My invention relates particularly to power units, etc., constructed so as to simplify the same, which may be used to perform work, as, for instance, in the operation of the different parts of automotive vehicles, such, for example, as brakes, etc.

The present application is a continuation in part of my copending application upon "Pressure Fluid Operated Pressure Intensifier," Serial No. 539,584, filed June 9, 1944.

The object of my invention is to provide a simplified power unit which may be used for the operation of any desired element to be moved to perform work, but which is applicable especially to the operation of brakes in automotive vehicles, as, for instance, automobiles, airplanes, etc. The object of my invention is also to provide power units of the above character in which some of the piping and valve structure may be eliminated. Another object is to provide an effective means for obtaining liquid compensation in a hydraulic system. A further object is to locate the valves of the unit at the same end thereof. Another object is to avoid valves in the power plunger. Further objects of my invention will appear from the detailed description of the same hereinafter.

While my invention is capable of being carried out in many different ways, I have shown only certain forms thereof in the accompanying drawings, in which:

Fig. 2 is a diagrammatic longitudinal section of another form of my power unit, using a diaphragm for application of power;

Fig. 3 is a diagrammatic longitudinal section of another modification of the power unit; and Fig. 4 is a diagrammatic longitudinal section of a further modification of my invention, having an inlet coaxial with the power plunger.

Figure 1:
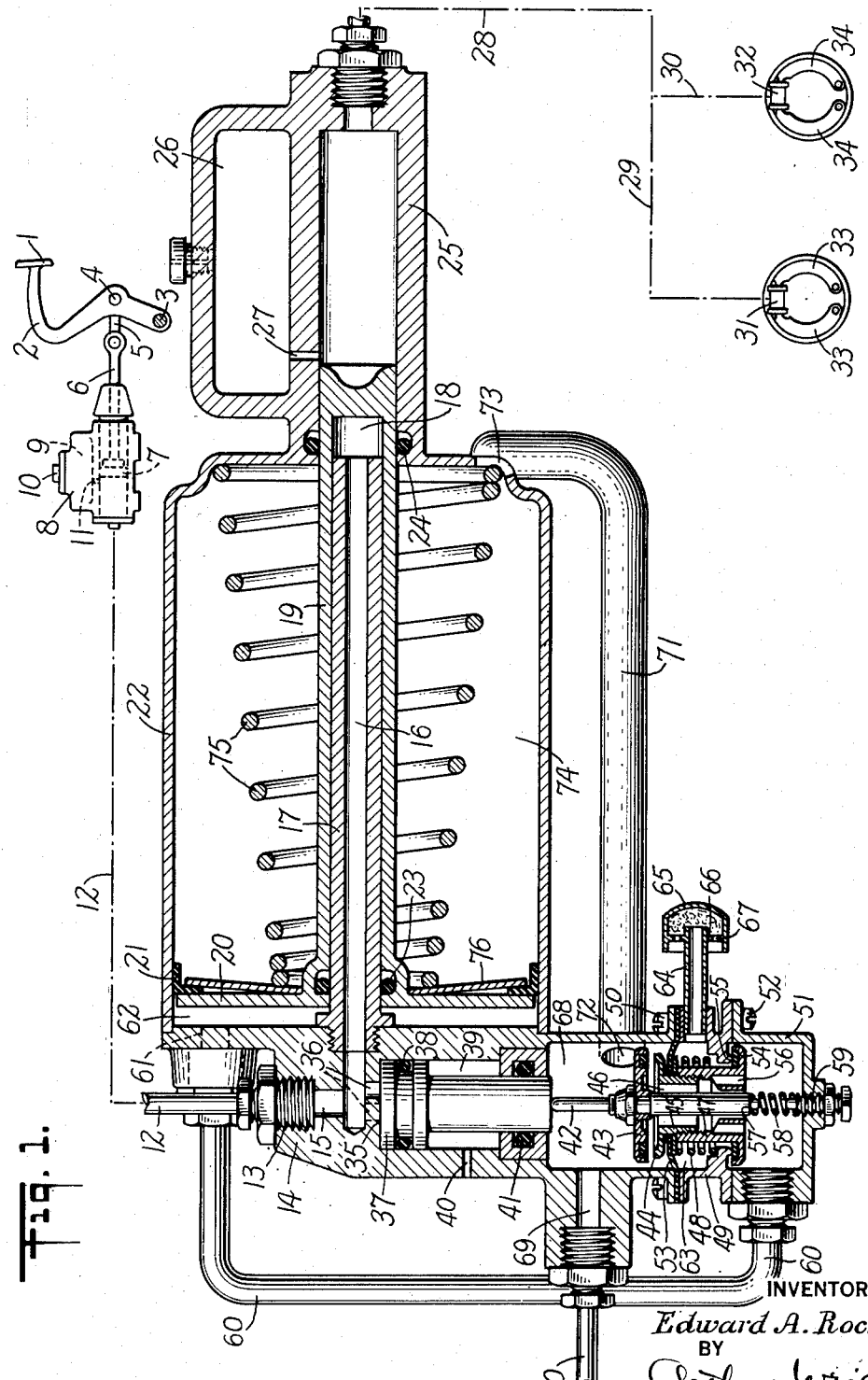
Fig. 1 is a longitudinal section of a form of my power unit, shown diagrammatically, utilizing a power piston.

In the drawings, referring first to Fig. 1, I have provided a pedal 1 carried by a pedal lever 2 mounted on a pivot 3 carried by the chassis of an automobile. The lever 2 has a pivot 4 for a link 5 which is connected to a piston rod 6 having a piston 7 operating in a master cylinder 8. The master cylinder has the usual reservoir 9 provided with a vented filling cap 10 and a liquid compensation port 11 to supply liquid to the cylinder in the retracted position of the piston 7. The cylinder 8 is connected by a pipe 12 to an inlet opening 13 in a casing 14 which is provided with a chamber 15 which connects with a passageway 16 in a monitor piston 17 screw-threaded into the side of the casing 14. The passageway 16 communicates with a chamber 18 in the end of a hollow plunger 19 having a piston 20 which is provided with a leather sealing ring 21 fitting within a power cylinder 22. The plunger 19 has an internal annular seal 23. The plunger 19, also, has a rubber seal 24 carried by a cylinder 25. Beyond the right-hand end of the plunger 19 there is the hydraulic pressure-increasing cylinder 25 forming a part of the cylinder 22, having a liquid compensation reservoir 26 with a liquid compensation port 27, the cylinder 25 being connected by an outlet and a pipe 28 to branch pipes 29 and 30 leading to brake cylinders 31 and 32, respectively, which are connected, respectively, to brake shoes 33 and 34 on the rear wheels of the automobile. It will be understood, of course, that similar branch pipes and brake cylinders may be connected to the pipe 28 leading to front wheel brakes on the automobile, if desired.

Within the chamber 15 below the opening 13 there is also provided a plunger stop 35 adjacent to a plurality of small apertures 36 cooperating with the top of a plunger 37. The plunger has a rubber seal 38 operating within a chamber 39 in the valve casing 14. Communicating with the chamber 39 there is a breather port 40. At its lower end the plunger 37 passes through a seal 41 in the casing 14 and contacts with a valve stem 42 on which there is carried a vacuum valve 43 adapted to seat on a valve seat 44 carried by a screw ring 45 having a series of internal flutings 46 for guiding the valve stem 42. The valve ring 45, furthermore, is screw-threaded to an air inlet valve member 47 normally pressed upwardly by a helical spring 48 seated within a spacing ring 49 secured by screws 50 to the valve casing 14 and to a cap 51 by screws 52. Between the spacing ring 49 and the valve casing 14 there is clamped, at its outer periphery, a diaphragm 53, the inner periphery thereof being clamped between the screw ring 45 and the air inlet valve member 47. It will be noted, furthermore, that the air inlet valve member 47 has a flange valve 54 which cooperates with a valve seat 55 on the spacing ring 49 and that the said valve member 47 has a series of longitudinal passageways 56 acting to permit the passage of air. On the stem 42 there is a shoulder 57 supporting a helical spring 58, the lower end of which is capable of being compressed as it is supported by an adjusting screw 59 screw-threaded in the cap 51. The cap 51, furthermore, is connected by a pipe 60 to an inlet 61 leading to a chamber 62 in the power cylinder 22. Also, within the spacing ring 49 there is a chamber 63 having an air inlet pipe 64 covered by a cap 65 supported therefrom by a spider ring 66 having air inlet apertures 67. The valve casing 14 has a vacuum chamber 68 which communicates by a port 69 with a pipe 70 which is connected to the manifold of the automobile engine. Also, said valve casing has a vacuum pipe connection 71 leading from a port 72 in the valve casing 14 to a port 73 in a vacuum chamber 74, at the right of the piston 20, in which there is located a helical spring 75 supported at one end by the cylinder 22 and at the other end against a ring 76 which is pressed by the spring 75 against the leather washer 21 to retain it in place.

In the form of my invention as shown in Fig. 2, I have provided the usual pedal 77 mounted on a fixed pivot 78 having a pivotal connection 79 by a link 80 to a piston rod 81 in a master cylinder 82 which is connected by a hydraulic line 83 to an inlet 84 on a combined plunger and diaphragm housing 85. The housing 85 has a flange 86 enclosed by a U-shaped split-ring 87, the ends of which have a bolt 88 pulling them together in a peripheral direction. Said ring 87, also, clamps a flange 89 of a diaphragm housing 90 which has a connection 91 to any desired source of vacuum. Integral with the diaphragm housing 90 there is a cylinder 92, having a liquid compensation reservoir 93 and a liquid compensation passageway 94, having an outlet 95 connected by a hydraulic line 96 to wheel cylinders 97 of front and rear wheels 98 on the automobile. The cylinder 92 receives one end of a rearwardly-directed plunger 99 which is clamped to the middle portion of a flexible diaphragm 100 by a clamping plate 101 and screws 102. The outer periphery of the diaphragm 100 is clamped between the flanges 86 and 89 by the clamping ring 87. Integral with the plunger 99 and at the forward end thereof, there is a smaller plunger 103 which slides within a sleeve 104 carried by the cylinder 85. The forward end of the sleeve 104 has an aperture 105 which is connected by means of a chamber 106 to the hydraulic inlet port 84. The sleeve 104 serves as a movable operating means for a projection 107 on a valve-operating lever 108 which has a pivotal support 109 by means of ears 110 on the plunger 99 at one side of the plunger 103. At one end the lever 108 has a resisting spring 111 providing a support from the plunger 99 and near its other end carries an adjustable screw-threaded stop 112. At this end of the lever 108 there is a pivotal connection 113 to a valve-operating rod 114 connected to a vacuum inlet valve 115 cooperating with a valve seat 116 on a subsidiary diaphragm 117 which is connected to an air inlet valve sleeve 118 having an air inlet valve 119 for cooperating with an air valve seat 120. A relatively resistant, lever actuated, spring 121 is provided for normally seating the air valve 119 on its seat 120. It will be understood that this vacuum and air valve construction is the same as shown in detail in Fig. 1 described hereinabove. The said spring 121 is located in an air chamber 122 which leads to a passageway 123 in the plunger 99 which ends in a nipple 124 connected by a flexible conduit 125 to an air inlet port 126.

The modification shown in Fig. 3 is constructed the same as the modification shown in Fig. 2, except that in this instance a piston 127 is shown fitting within a cylinder 128 and except for the arrangement of the valves. In this instance I have provided on the cylinder 128 a smaller cylinder 129 having a plunger 130 within the same, which is provided with a cylindrical aperture 131. A plunger 132 slides within the sleeve 130 and is arranged to rest against the rear end of a valve-operating lever 133 having a central aperture 134 to permit the plunger 132 to pass through the same. The upper end of the valve-operating lever 133 has a pivot 135 connecting it to a valve-operating rod 136 on a valve 137 which seats against a valve seat 138 within the piston 127 which is connected by a passageway 139 to the chamber within the cylinder 128 at the left of the piston 127. A spring 140, supported on a seat 141, normally presses the valve 137 to the right so as to open a port 142 leading from the chamber at the left of piston 127 to the right face of the piston 127. The said valve 137, thus, normally conveys the vacuum from the left to the right face of the piston 127. The lower end of the valve-operating lever 133 has a pivot 143 connecting it to a valve-operating rod 144 on an air inlet valve 145 which is normally pressed against a valve seat 146 by a spring 147 carried by a recess 148 in a chamber 149 in the piston 127. The said chamber 149 has a port 150 connecting it to the right face of the piston 127 and has a passage 151 leading to a nipple 152 connected by a rubber tube 153 to a vent, as shown in the modification in Fig. 2. This modification of my invention, shown in Fig. 3, thus, receives on the manual means a reaction from the air pressure admitted to the right side of the piston 127 according to the hydraulic reaction from the hydraulic liquid applied by the power unit to the wheel cylinders inasmuch as said admitted air pressure acts on the left end of the plunger 130 and hence produces a "feel" by the master cylinder liquid, but, on account of the manner in which the valves are mounted, the manual means does not receive any substantial reaction from the modulating valve-operating mechanism as the admitted air pressure tends to move the valve lever 133 away from the plunger 130.

In Fig. 4 I have shown diagrammatically a modified form of my invention which is constructed just like the embodiment shown in Fig. 2, with the following differences, however. In this instance I have provided a cylinder 154 having reciprocable therein a piston 155 on which there is supported, by means of a spring 156, a valve lever 157 just like the valve-operating member in Fig. 2 and which is arranged to operate a valve mechanism constructed the same as the inlet and outlet valve mechanism for the vacuum and air as shown in Fig. 2. Resting against the end of the lever 157, in order to operate the same, there is a plunger 158 which reciprocates in a cylinder 159 adapted to be moved by the hydraulic liquid received from a master cylinder pipe 160. Also, in this instance, there is an air inlet port 161 in an air filter cap 162 screw-threaded in the end of the cylinder 159, which is on the end of a hollow plunger 163 passing through a packing 164 in the cylinder 159. The hollow plunger 163 thus passes into the cylinder 154 so that the air is conveyed through a longitudinal passageway 166 therein to an air chamber 167 in the piston 155, so as to be led therefrom by means of a radial passageway 168 to the valve mechanism operated by the lever 157, in the same manner as shown in Fig. 2.

In the embodiment of my invention shown in Fig. 1, when manual pressure is applied to the pedal 1, the master cylinder 8 supplies the fluid under pressure through the pipe 12 to the inlet 13, where, also, the liquid passes through the apertures 36 adjacent to the stop 35. The liquid, thus, under pressure from the piston 7, produced by the pedal 1, acts in the chamber 18 on the end of the means 19 to move the piston 20 so as to force the liquid out of the cylinder 25. The liquid passes from the cylinder 25 and thence through the pipe 28 to the brake cylinders 31 and 32, thus setting the brakes. Upon the further increase of the manual pressure the plunger 37 is moved forwardly against the compression of the spring 58, by the hydraulic pressure from the apertures 36, thus moving the vacuum outlet valve 43 into closed position, followed by the opening of the air inlet valve 54 which admits air from the pipe 64 past the valve 54 into the pipe 60 and thence into the chamber 62 in the power cylinder 22. The piston 19, having been previously submerged in a vacuum, is now moved to the right by the air pressure in the chamber 62, thus moving the end of said piston into the cylinder 25 and producing an intensified pressure which is supplied by the pipe 28 to the brake cylinders 31 and 32. This application of the intensified pressure is, thus, controlled in modulating amounts by the operation of the valves 43 and 54, which are self-lapping so that they are both closed in changing from a position in which both valves are closed to a position where more air is admitted to apply greater braking force, or to a position where more vacuum is admitted to apply a lessened braking force. Throughout the application of manual force or intensified pressure from the cylinder 25 there will be a coordinate feel sensed by the operator on the pedal 1, according to the amount of braking force applied. Also, in this form of my invention there is provided a coordination of the travel of the pedal with the amount of travel of the brake-operating elements by reason of the monitor chamber 18, for the reason that as the piston 19 moves towards the right a coordinate amount of fluid is drawn into the chamber 18, so that the operator of the pedal 1 not only has a feel, but also senses the change of position which is coordinate to the amount of braking pressure and intensified pressure liquid supplied to the brakes. In this construction it will be noted that all the valves are conveniently located on one end closure for the power cylinder. Also, in this instance, the reaction is felt on the manual means from both the modulating valves and the air pressure at the right of the diaphragm 100 according to the hydraulic power pressure exerted on the brakes.

In the operation of the power unit shown in Fig. 2, when the manual pressure liquid delivered by the master cylinder 82 is received in the inlet 84, the liquid, under pressure from piston 99, passes directly through the pipe 96 to the brake cylinders 97 from the cylinder 92. The wheel brakes will, thus, be given their initial movement in this manner, as, for example, to set the brakes and perhaps apply some of the braking pressure. When the manual pressure in the pipe 83 is increased, however, the plunger 99 will be moved further. This forward movement of the plunger 99 is brought about by the movement of the sleeve 104 forwardly by the master cylinder acting on the restricted effective pressure area at the right hand end of the sleeve 104, thus moving the valve lever 108 against the force of the spring 111 and the spring 121 to seat the vacuum valve 115, 116, followed by the unseating of the air inlet valve 119, 120, which admits air from the air port 126 to the right face of the diaphragm 100, resulting in the movement of the plunger 99 towards the left and thus also exerting the reaction force on the left end of the plunger 104 and hence produces a "feel" by the master cylinder liquid, in addition to a reaction from the modulating valves acting, by means of the lower end of the lever 107, on the plunger 104. In any position of rest of the foot thus attained on the pedal 77, the air valve 119, 120 will become seated in lapped position with regard to the valve 115, 116. Further forward movement, due to increased manual pressure, will again unseat the air valve 119, 120 to apply further movement of the plunger 99 towards the left so as to exert a higher braking effort on the braking cylinders 97. In the release of the pressure from the brakes, the air valve 119, 120 will close and the vacuum admission valve 115, 116 will open, thus restoring the vacuum to both sides of the diaphragm 100. During this operation of applying hydraulic liquid under power pressure to the wheel cylinders 97, the reaction on the manual means will be due only to the amount of air pressure exerted on the right face of the diaphragm 100 by the operation of the modulating valve means and owing to the modulating valve being mounted on the diaphragm 117.

In the operation of the form of my invention shown in Fig. 3, the operation is the same essentially as Fig. 2, the pressure from the master cylinder being exerted on one end of the plunger 132 so that the other end of the plunger 132 exerts the hydraulic pressure on the brake cylinders, which is augmented by the air admitted by the valve device acting on the power piston, and the reaction exerted on the manual means to provide a "feel" in this instance is the reaction from the air admitted to the right of the piston 127 according to the hydraulic pressure liquid, for instance in the pipe 96, applied by the power derived from the piston 127 of the power unit on the brake cylinders. Also, it will be noted that the valve operating sleeve 130 operates a type of valve mounting which does not receive a reaction from the air pressures admitted, to any substantial extent.

The operation of the modification of my invention shown in Fig. 4 is the same as the operation of the form of the apparatus shown in Fig. 3, with the exception that, in this instance, the reaction to provide the "feel" is through the valve means and the air is admitted to the apparatus from the air inlet port 161 at the forward end of the unit through the passageway 166 in the plunger 163 and from the chamber 167 to the modulating valve apparatus which is mounted on the piston 155 and which is controlled by the plunger 158 under the influence of the manual pressure exerted on the master cylinder piston to be applied to the liquid received by the hydraulic line 160 leading from the master cylinder.

While I have described my invention above in detail, I wish it to be understood that many changes may be made therein without departing from the spirit of the same.

I claim:

1. A power unit, comprising a connection on the power unit adapted to be connected to a source of pressure differing from the atmospheric pressure, a power motor having a movable wall, a chamber containing said wall, a hydraulic plunger operated by said wall, said plunger being provided with a chamber in which one end of said plunger operates, a valve mechanism carried by the unit for controlling the application of said pressure to said motor, hydraulic means for receiving pressure from a master cylinder, having a hydraulic connection to the opposite end of said plunger for moving the plunger so that a reaction is exerted from the applied power to said master cylinder hydraulic connection, said master cylinder being provided for suppling to the unit hydraulic fluid to control the valve mechanism, a valve operating sleeve located around a portion of said plunger, an element adapted to perform work, and a hydraulic connection from said element to the plunger chamber having a liquid compensating reservoir provided with a compensation port cooperating with said other end of plunger.

2. A power unit, comprising a connection on the power unit adapted to be connected to a source of pressure differing from the atmospheric pressure, a power motor, having a movable wall, a chamber containing said wall, a hydraulic plunger operated by said wall, said plunger being provided with a chamber in which it operates, a valve mechanism carried by the unit on the movable wall outside of said plunger for controlling the application of said pressure to said motor, hydraulic means for receiving pressure from a master cylinder for supplying to the unit hydraulic fluid to control the valve mechanism, a valve operating plunger movable relative to the said plunger and located away from said plunger chamber, an element adapted to perform work, and a hydraulic connection from said element to the plunger chamber having a liquid compensating reservoir provided with a compensation port at the rear of the plunger chamber uncovered by said plunger when retracted.

3. A power unit, comprising a connection on the power unit adapted to be connected to a source of pressure differing from the atmospheric pressure, a power motor having a movable wall, a chamber containing said wall, a hydraulic plunger operated by said wall, said plunger being provided with a chamber in which one end of said plunger operates, a valve mechanism carried by the unit for controlling the application of said pressure to said motor, an air inlet on the unit connected to the valve mechanism, hydraulic means for receiving pressure from a master cylinder, having a hydraulic connection to the opposite end of said plunger for moving the plunger so that a reaction is exerted from the applied power to said master cylinder hydraulic connection, said master cylinder being provided for supplying to the unit hydraulic fluid to control the valve mechanism, a valve operating sleeve located around a portion of said plunger, an outlet adapted to be connected to a fluid pressure delivery line for supplying a fluid motor, and a hydraulic compensating reservoir provided with a compensation port cooperating with said other end of plunger.

4. A power unit, comprising a connection on the power unit adapted to be connected to a source of pressure differing from the atmospheric pressure, a power motor, having a movable wall, a chamber containing said wall, a hydraulic plunger operated by said wall, said plunger being provided with a chamber in which it operates, a valve mechanism carried by the unit on the movable wall outside of said plunger for controlling the application of said pressure to said motor, an air inlet on the unit connected to the valve mechanism, hydraulic means for receiving pressure from a master cylinder for supplying to the unit hydraulic fluid to control the valve mechanism, a valve operating plunger movable relative to the said plunger and located away from said plunger chamber, an outlet adapted to be connected to a fluid pressure delivery line for supplying a fluid motor hydraulically connected to said plunger chamber, and a hydraulic compensating reservoir provided with a compensation port at the rear of the plunger chamber uncovered by said plunger when retracted.

5. A power unit, comprising a connection on the power unit adapted to be connected to a source of pressure differing from the atmospheric pressure, a power motor, having a movable wall, a chamber containing said wall, a hydraulic plunger operated by said wall, said plunger being provided with a chamber in which it operates, a valve mechanism carried by the unit for controlling the application of said pressure to said motor, an air inlet in the unit having a plunger located in the air inlet connected to the movable wall, hydraulic means for receiving pressure from a master cylinder for supplying to the unit hydraulic fluid to control the valve mechanism, an outlet adapted to be connected to a fluid pressure delivery line for supplying a fluid motor, and a hydraulic compensating reservoir provided with a compensation port cooperating with said first mentioned plunger.

6. A power unit, comprising a connection on the power unit adapted to be connected to a source of pressure differing from the atmospheric pressure, a power motor, having a movable wall, a chamber containing said wall, a hydraulic plunger operated by said wall, said plunger being provided with a chamber in which it operates, a valve mechanism carried by the unit on the movable wall for controlling the application of said pressure to said motor, an air inlet in the unit having a plunger located in the air inlet connected to the movable wall, hydraulic means for receiving pressure from a master cylinder for supplying to the unit hydraulic fluid to control the valve mechanism, an outlet adapted to be connected to a fluid pressure delivery line for supplying a fluid motor, and a hydraulic compensating reservoir provided with a compensation port cooperating with said first mentioned plunger.

7. A power unit, comprising a connection on the power unit adapted to be connected to a source of pressure differing from the atmospheric pressure, a power motor, having a movable wall, a chamber containing said wall, a hydraulic plunger operated by said wall, said plunger being provided with a chamber in which it operates, a valve mechanism carried by the unit outside of said plunger for controlling the application of said pressure to said motor, an air inlet on the unit having a flexible tube connected to the valve mechanism, hydraulic means for receiving pressure from a master cylinder for supplying to the unit hydraulic fluid to control the valve mechanism, a valve operating plunger movable relative to the said plunger and located away from said plunger chamber, an outlet adapted to be connected to a fluid pressure delivery line for supplying a fluid motor, and a hydraulic compensating reservoir provided with a compensation port cooperating with said plunger.

8. A power unit, comprising a connection on the power unit adapted to be connected to a source of pressure differing from the atmospheric pressure, a power motor, having a movable wall, a chamber containing said wall, a hydraulic plunger operated by said wall, said plunger being provided with a chamber in which it operates, a valve mechanism carried by the unit on the movable wall outside of said plunger for controlling the application of said pressure to said motor, an air inlet on the unit having a flexible tube connected to the valve mechanism, hydraulic means for receiving pressure from a master cylinder for supplying to the unit hydraulic fluid to control the valve mechanism, a valve operating plunger movable relative to the said plunger and located away from said plunger chamber, an outlet adapted to be connected to a fluid pressure delivery line for supplying a fluid motor, and a hydraulic compensating reservoir provided with a compensation port cooperating with said plunger.

9. A power unit, comprising a connection on the power unit adapted to be connected to a source of pressure differing from the atmospheric pressure, a power motor, having a movable wall, a chamber containing said wall, a hydraulic plunger operated by said wall, said plunger being provided with a chamber in which it operates, a valve mechanism carried by the unit on the movable wall outside of said plunger for controlling the application of said pressure to said motor, hydraulic means for receiving pressure from a master cylinder for supplying to the unit hydraulic fluid to control the valve mechanism, an element adapted to perform work, a hydraulic connection from said element to the plunger chamber having a liquid compensating reservoir provided with a compensation port at the rear of the plunger chamber uncovered by said plunger when retracted, and a valve operating piston movable relative to said plunger and located away from the said plunger chamber between the master cylinder and the valve mechanism.

10. A power unit, comprising a connection on the power unit adapted to be connected to a source of pressure differing from the atmospheric pressure, a power motor, having a movable wall, a chamber containing said wall, a hydraulic plunger operated by said wall, said plunger being provided with a chamber in which it operates, a valve mechanism carried by the unit on the movable wall outside of said plunger for controlling the application of said pressure to said motor, an air inlet on the casing connected to the valve mechanism, hydraulic means for receiving pressure from a master cylinder for supplying to the unit hydraulic fluid to control the valve mechanism, an outlet adapted to be connected to a fluid pressure delivery line for supplying a fluid motor, a hydraulic compensating reservoir provided with a compensation port at the rear of the plunger chamber uncovered by said plunger when retracted, and a valve operating piston movable relative to said plunger and located away from the said plunger chamber between the master cylinder and the valve mechanism.

11. A power unit, comprising a connection on the power unit adapted to be connected to a source of pressure differing from the atmospheric pressure, a power motor, having a movable wall, a chamber containing said wall, a hydraulic plunger operated by said wall, said plunger being provided with a chamber in which it operates, a valve mechanism carried by the unit on the movable wall for controlling the application of said pressure to said motor, hydraulic means for receiving pressure from a master cylinder for supplying to the unit hydraulic fluid to control the valve mechanism, an element adapted to perform work, a hydraulic connection from said element to the power unit having a liquid compensating reservoir provided with a compensation port cooperating with said plunger, and a valve operating piston around a portion of the hydraulic plunger located between the master cylinder and the valve mechanism on the other side of the movable wall from said plunger chamber.

12. A power unit, comprising a connection on the power unit adapted to be connected to a source of pressure differing from the atmospheric pressure, a power motor, having a movable wall, a chamber containing said wall, a hydraulic plunger operated by said wall, said plunger being provided with a chamber in which it operates, a valve mechanism carried by the unit on the movable wall for controlling the application of said pressure to said motor, an air inlet on the casing connected to the valve mechanism, hydraulic means for receiving pressure from a master cylinder for supplying to the unit hydraulic fluid to control the valve mechanism, an outlet adapted to be connected to a fluid pressure delivery line for supplying a fluid motor, a hydraulic compensating reservoir provided with a compensation port cooperating with said plunger, and a valve operating piston around a portion of the hydraulic plunger located between the master cylinder and the valve mechanism on the other side of the movable wall from said plunger chamber.

13. A power unit, comprising a connection on the power unit adapted to be connected to a source of pressure differing from the atmospheric pressure, a power motor, having a movable wall, a chamber containing said wall, a hydraulic plunger operated by said wall, said plunger being provided with a chamber in which it operates, a valve mechanism carried by the unit on the movable wall outside of said plunger for controlling the application of said pressure to said motor, hydraulic means for receiving pressure from a master cylinder for supplying to the unit hydraulic fluid to control the valve mechanism, an element adapted to perform work, a hydraulic connection from said element to the power unit having a liquid compensating reservoir provided with a compensation port cooperating with said plunger, a valve operating lever, and a valve operating piston movable relative to said plunger and located away from the said plunger chamber between the master cylinder and the valve lever.

14. A power unit, comprising a connection on the power unit adapted to be connected to a source of pressure differing from the atmospheric pressure, a power motor, having a movable wall, a chamber containing said wall, a hydraulic plunger operated by said wall, said plunger being provided with a chamber in which it operates, a valve mechanism carried by the unit on the movable wall outside of said plunger for controlling the application of said pressure to said motor, an air inlet on the casing connected to the valve mechanism, hydraulic means for receiving pressure from a master cylinder for supplying to the unit hydraulic fluid to control the valve mechanism, an outlet adapted to be connected to a fluid pressure delivery line for supplying a fluid motor, a hydraulic compensating reservoir provided with a compensation port cooperating with said plunger, a valve operating lever, and a valve operating piston movable relative to said plunger and located away from the said plunger chamber between the master cylinder and the valve lever.

15. A power unit, comprising a connection on the power unit adapted to be connected to a source of pressure differing from the atmospheric pressure, a power motor, having a movable wall, a chamber containing said wall, a hydraulic plunger operated by said wall, said plunger being provided with a chamber in which it operates, a valve mechanism carried by the unit on the movable wall for controlling the application of said pressure to said motor, hydraulic means for receiving pressure from a master cylinder for supplying to the unit hydraulic fluid to control the valve mechanism, an element adapted to perform work, a hydraulic connection from said element to the plunger chamber having a liquid compensating reservoir provided with a compensation port cooperating with said plunger, a valve operating lever and a valve operating piston located between the master cylinder and the valve lever, said hydraulic plunger having its ends extending to opposite sides of the movable wall, an end being connected hydraulically to the master cylinder and the other end connected hydraulically to said element.

16. A power unit, comprising a connection on the power unit adapted to be connected to a source of pressure differing from the atmospheric pressure, a power motor, having a movable wall, a chamber containing said wall, a hydraulic plunger operated by said wall, said plunger being provided with a chamber in which it operates, a valve mechanism carried by the unit on the movable wall for controlling the application of said pressure to said motor, an air inlet on the casing connected to the valve mechanism, hydraulic means for receiving pressure from a master cylinder for supplying to the unit hydraulic fluid to control the valve mechanism, an element adapted to perform work, a hydraulic compensating reservoir provided with a compensation port cooperating with said plunger, a valve operating lever, and a valve operating piston located between the master cylinder and the valve lever, said hydraulic plunger having its ends extending to opposite sides of the movable wall, an end being connected hydraulically to the master cylinder and the other end connected hydraulically to said element by said plunger chamber.

EDWARD A. ROCKWELL.

REFERENCES CITED

The following references are of record in the file of this patent:

UNITED STATES PATENTS

| Number | Name | Date |
| --- | --- | --- |
| 2,191,318 | Hoyt | Feb. 20, 1940 |
| 2,229,247 | Kamenarovic | Jan. 21, 1941 |
| 2,352,357 | Almond | June 27, 1944 |
| 2,365,471 | Ingres | Dec. 19, 1944 |
| 2,373,272 | Stelzer | Apr. 10, 1945 |
| 2,377,699 | Klimkiewicz | June 5, 1945 |
| 2,387,942 | Price | Oct. 30, 1945 |
| 2,406,328 | Gunderson | Aug. 27, 1946 |
| 2,407,856 | Stelzer | Sept. 17, 1946 |
| 2,415,035 | Penrose | Jan. 28, 1947 |
| 2,475,105 | Mitton | July 5, 1949 |